United States Patent [19]

Yamanaka

[11] Patent Number: 4,626,893

[45] Date of Patent: Dec. 2, 1986

[54] WHITE BALANCE ADJUSTING SYSTEM FOR PLURAL COLOR TELEVISION CAMERAS

[75] Inventor: Junichi Yamanaka, Sagamihara, Japan

[73] Assignee: Kabushiki Kaisha Toshiba, Kawasaki, Japan

[21] Appl. No.: 601,591

[22] Filed: Apr. 18, 1984

[30] Foreign Application Priority Data

Apr. 22, 1983 [JP] Japan ................................ 58-069988

[51] Int. Cl.⁴ ............................................ H04N 9/73
[52] U.S. Cl. ........................................ 358/29; 358/10
[58] Field of Search ................... 358/29 C, 181, 10, 51

[56] References Cited

U.S. PATENT DOCUMENTS

| | | | |
|---|---|---|---|
| 3,808,358 | 4/1974 | Schneider | 358/29 C |
| 4,191,971 | 3/1980 | Dischert | 358/181 |
| 4,314,272 | 2/1982 | Miyaji | 358/10 |
| 4,320,414 | 3/1982 | Miyaji | 358/51 |
| 4,340,903 | 7/1982 | Tamura | 358/29 C |

Primary Examiner—Michael A. Masinick
Attorney, Agent, or Firm—Finnegan, Henderson, Farabow, Garrett & Dunner

[57] ABSTRACT

In a white balance adjusting system for plural color television cameras, the output of a video switching unit which selectively switches video signals from television color cameras is applied to a single white balance adjustment circuit, the white balance condition of the selected video signal is detected by the white balance adjustment circuit using a reference value common to the cameras and the output of the white balance adjustment circuit is supplied to the camera selected by the video switching unit. Thus, the white balance of the respective cameras is adjusted.

10 Claims, 1 Drawing Figure

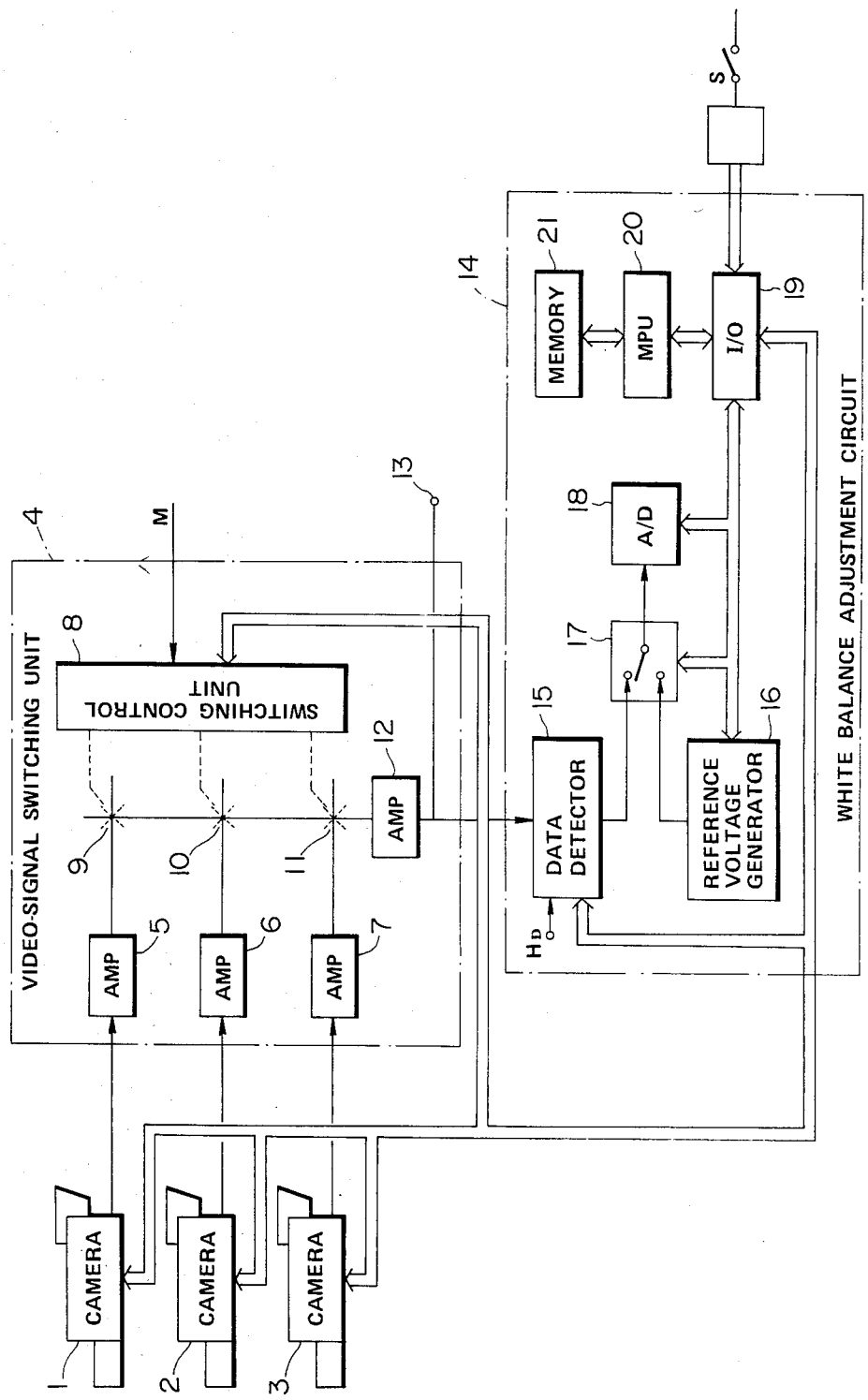

WHITE BALANCE ADJUSTING SYSTEM FOR PLURAL COLOR TELEVISION CAMERAS

BACKGROUND OF THE INVENTION

1. Field of the Invention

The present invention relates to systems for adjusting the white balance of a plurality of color television cameras, and more specifically, to a white balance adjusting system which can eliminate the need to compensate for an error caused by a difference between the reference values of the cameras and an error caused by a video switching system.

2. Description of the Prior Art

Recently, an automatic adjustment system for use in broadcasting color television cameras (hereinafter, referred to as color cameras) has been put to practical use, so that troublesome registration and white balance adjustments, which have so far been conducted by experienced operators, can be achieved in a short time with use of a microcomputer and the like.

In such a system, adjustment of a camera is automatically effected wherein a value corresponding to an adjustment item is detected from a video signal generated from the each color camera and the detected value is compared with a reference value, so as to lie within an allowable range. However, this type system has a problem in that automatic white balance adjustment is unsatisfactory although registration adjustment can be achieved with a high accuracy. In a television program production, three to six color cameras are generally used and the color tone among these cameras must coincide with one another, which depends largely on the accuracy of the white balance of these cameras.

When the above automatic adjustment color cameras are used in the program production, in order to obtain a white balance coincidence among the cameras, the white balance reference values of each camera must be adjusted to be equal, or a single reference value must be applied to the respective cameras. In the latter case, applying the single reference value to the respective cameras through an distributing system will cause an error, requiring re-adjustment.

After the white balance adjustment has been completed, the video signals from the cameras are sent to a video switching unit where the respective video signals are selected through its switching operation. In switching of the video switching unit, by the unbalance of cable loss and differences of terminal matching characteristics among the video signals, gains of the video signals may become different from each other, causing the lost of the white balance. Thus, further re-adjustment must be made manually.

SUMMARY OF THE INVENTION

In view of the above, it is an object of the present invention to provide a white balance adjusting system for a plurality of color television cameras which can eliminate the need to compensate for an error caused by a difference between the reference values of the cameras and an error caused by a video switching system.

According to the present invention, to accomplish the above object, the output of a video switching unit which selectively switches video signals from television color cameras is applied to a single white balance adjustment circuit, the white balance condition of the selected video signal is detected by the white balance adjustment circuit using a reference value common to the cameras and the output of the white balance adjustment circuit is supplied to the camera selected by the video switching unit. Thus, the white balance of the respective cameras is adjusted.

The present invention comprises a plurality of color television cameras, a video switching unit for selectively switching video signals sent from the cameras, a white balance adjustment circuit for detecting the white balance condition of the video signal from the video switching unit and generating a predetermined adjustment output, and means for supplying the adjustment output of the adjustment circuit to the camera selected by the video switching unit to adjust the white balance of the selected camera, whereby the white balance adjustment of the cameras using the video switching unit can be effected with high accuracy.

BRIEF DESCRIPTION OF THE DRAWING

The drawing is an arrangement of a circuit showing a white balance adjusting system for a plurality of color television cameras in accordance with the present invention.

DESCRIPTION OF THE PREFERRED EMBODIMENT

In the drawing, the white balance of color cameras 1, 2 and 3 are respectively automatically adjusted by a white balance adjusting circuit which will be described later, and respective output video signals of the cameras are supplied to respective input amplifiers 5, 6 and 7 in a video-signal switching unit 4. The video signals are sent from the amplifiers 5, 6 and 7 to switches 9, 10 and 11 which in turn are selectively switched by a switching control circuit 8, respectively. In other words, the switches 9, 10 and 11 are selectively connected under control of the switching control circuit 8. More specifically, the circuit 8 in turn controls the switch 9, 10 and 11 on the basis of a manual switching signal M and a command signal to be described later. The video signals from the switches 9, 10 and 11 are sent through a distributing amplifier 12 to an output terminal 13 as a main line output. The main line output is supplied through the terminal 13 to the next stage equipment such as a video tape recorder (VTR).

The video signal from the distributing amplifier 12 is also supplied to a white balance adjusting circuit 14. The circuit 14 comprises, as shown in the drawing, a data detecting circuit 15, a reference voltage generating circuit 16, a switch circuit 17, an analog-to-digital (A/D) converter 18, an input/output (I/O) interface 19, an arithmetic circuit 20 such as a microprocessor and a memory 21 comprising ROM or RAM, and functions to generate data necessary for white balance adjustment of the above color cameras 1, 2 and 3. The video signal from the distributing amplifier 12 is sent to the data detector 15 having a sample holding circuit where signal components corresponding to the adjustment items of the white balance adjustment are detected and held. More specifically, the data detector 15 receives a horizontal drive signal $H_D$ from a deflecting circuit to generate various gate signals, and detects part of the input video signal on the basis of the gate signals. The switch circuit 17 receives the detected component signals or detection signals from the data detector 15 and respective reference value signals corresponding to the adjustment items of the white balance adjustment from the reference voltage generator 16. The reference value signals from the generator 16 correspond to such adjustment items as the white level, black level, gamma, knee and clipper adjustments concerning the white balance adjustment.

The switch circuit 17 switches to selectively send the detection and reference value signals. The selected output of the circuit 17 is converted by the A/D converter 18 to a digital signal which is further sent through the I/O interface 19 to the arithmetic circuit 20. The circuit 20 compares the detection data with the reference data in accordance with an arithmetic control program previously stored in the memory 21, and calculates the difference for each adjustment item. The difference data are transmitted to selected one of the color cameras 1, 2 and 3 to adjust the white balance of the selected camera.

Further, the arithmetic circuit 20 issues a switching command signal to the switching control circuit 8 to control the switches 9, 10 and 11, a data detection command signal to the data detector 15, a reference-value generation command signal to a reference voltage generator 16, a switching command signal to the switch circuit 17 and a conversion command signal to the A/D converter 18.

Explanation will now be made as to the operation of the present invention arranged as described above. First, the color cameras 1, 2 and 3 pick up a test chart (not shown) and supply the output video signals to the respective switches 9, 10 and 11 of the video-signal switching unit 4. When an automatic adjustment command signal is provided from a command switch S to the white balance adjustment circuit 14, the arithmetic circuit 20 detects the command signal through the I/O interface 19 and issues a command to the switching control circuit 8 to connect issues a switch 9, the data detection command to the data detector 15, issues a reference value generation command to the reference voltage generator 16 and issues a conversion command to the A/D converter 18. This causes the reference value of the generator 16 to be stored into the memory 21 through the switch circuit 17, the A/D converter 18, the I/O interface 19 and the arithmetic circuit 20. When the switch circuit 17 is then switched, the detection signals indicative of the adjustment items as components of the video signal of the camera 1 selected by the switch 9 are sent to the arithmetic circuit 20 through the switch 17, the A/D converter 18 and the I/O interface 19. In the arithmetic circuit 20, the detection data are compared with the respective reference data stored in the memory 21 for the adjustment items to calculate the data differences which are sent through the interface 19 to the camera 1. In the camera 1, adjustment is made for each adjustment item according to the difference data. The above detection and comparison operations are repeated until the accuracy of each item adjustment lies in its allowable range.

When the white balance adjustment of the camera 1 has been completed in this way, the arithmetic circuit 20 issues a command to the switching control circuit 8 to release the connection of the switch 9 and connect the switch 10. This causes the output video signal of the camera 2 to be sent through the switch 10 to the data detector 15. The adjustment of the camera 2 is made in the same manner as the camera 1. After the adjustment of the camera 2 has been finished, the switch 11 is connected and the similar adjustment is made as to the camera 3.

In this way, the white balance of the cameras 1, 2 and 3 is adjusted so as to lie within an allowable range. Since this adjustment is made on the basis of the same reference value, the cameras may all pick up the same object or objects regarded as the same, to accomplish the adjustment.

Further, the final adjustment data for the cameras 1, 2 and 3 is stored in the memory 21 so that, at the time of the next operation, this data is read out as initial data which is sent to the respective cameras.

As has been disclosed, according to the present invention, the white balance adjustment of the cameras 1, 2 and 3 is made on the basis of the same reference value and the same detection system including the video switching unit 4, whereby the white balance adjusting system of the invention can adjust the cameras to be in the same white balance condition without any error due to switching of the video switching unit 4, eliminating the need for making reference values equal to each other and the need for the manual re-adjustment of the prior art. Further, since the output video signals of the cameras 1, 2 and 3 are selectively switched by the video switching unit 4, the adjusting condition of the each camera can be monitored on a single picture monitor or a waveform monitor.

The invention may be arranged so that the reference value of the reference voltage generator 16 can be stored into the memory 21 without passing through the switch circuit 17, and the reference value is read out of the memory and compared with the detection signal sent from the data detection circuit 15, whereby the above described white balance adjustment is achieved without using the switch circuit 17.

In addition, the illustrated embodiment may be arranged so as to provide a registration adjustment for each of the cameras 1, 2 and 3 independently and to calculate the adjustment data necessary for this registration in the white balance adjustment circuit 4.

I claim:

1. A system for adjusting the white balance of a plurality of color television cameras, comprising:
    an output terminal;
    a video switching unit, coupled to the outputs of said plurality of cameras, for selectively switching a selected one video signal sent from a selected one of said cameras to said output terminal;
    a white balance adjustment circuit, coupled to said output terminal, for detecting the white balance condition of said selected one video signal from said video switching unit and generating an adjustment output in response thereto; and
    means for supplying said adjustment output of said adjustment circuit to said selected one of the cameras selected by said video switching unit to adjust the white balance of said selected one camera.

2. A white balance adjusting system as set forth in claim 1, wherein, after said white balance adjustment circuit generates said adjustment output for said selected one of said plurality of cameras, said video switching unit is switched to select the video signal from another one of said plurality of cameras.

3. A white balance adjusting system as set forth in claim 1, wherein said white balance adjustment circuit comprises means for storing respective reference values for predetermined adjustment items, means for extracting a component signal from said selected one video signal from said video switching unit, said component signal corresponding to one of said adjustment items, and means for comparing said component signal with said reference value for at least one of said adjustment items, whereby said adjustment output to be supplied to said selected one of said cameras is generated on the basis of an output of said comparing means.

4. A white balance adjusting system as set forth in claim 3, wherein said stored reference values pertain to white level, black level, gamma, knee and/or clipper adjustments.

5. A white balance adjusting system as set forth in claim 3, wherein said comparing means compares the signal extracted by said extracting means with said reference value with respect to each of said adjustment items to find the difference between that extracted signal and each of said reference values.

6. A white balance adjusting system as set forth in claim 3, wherein said storing means stores said reference values in the form of analog voltages, and said comparing means compares said extracted signal with said analog voltage after performing analog-to-digital conversion on said extracted signal and said analog voltage.

7. A white balance adjusting system as set forth in claim 3, wherein said storing means stores said reference values in the form of digital values and said comparing means compares said digital value with said extracted signal after performing analog-to-digital conversion on said extracted signal.

8. A white balance adjusting system as set forth in claim 3, wherein said video switching unit is switched to couple the video signal from another of said cameras to said output terminal in response to the output of said comparing means to thereby become said selected one video signal.

9. A white balance adjusting system as set forth in claim 1, wherein said video switching unit includes means for manually selecting the camera from which a video signal is coupled to said output terminal to thereby become said selected one video signal.

10. A white balance adjusting system as set forth in claim 1, wherein the same adjusting object is picked up by said plurality of cameras and the white balance adjustment of the each camera is effected on the basis of an associated one of the video signals generated from the cameras.

* * * * *